United States Patent
Rikitake et al.

(10) Patent No.: US 9,450,851 B2
(45) Date of Patent: Sep. 20, 2016

(54) COMMUNICATION APPARATUS AND METHOD

(75) Inventors: Nobuhiro Rikitake, Kawasaki (JP); Toshimichi Fukuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 958 days.

(21) Appl. No.: 13/444,214

(22) Filed: Apr. 11, 2012

(65) Prior Publication Data
US 2012/0275325 A1 Nov. 1, 2012

(30) Foreign Application Priority Data
Apr. 28, 2011 (JP) ................................. 2011-100942

(51) Int. Cl.
| | |
|---|---|
| H04L 12/26 | (2006.01) |
| H04L 12/931 | (2013.01) |
| H04L 12/46 | (2006.01) |
| H04L 12/24 | (2006.01) |
| H04L 12/935 | (2013.01) |

(52) U.S. Cl.
CPC ....... *H04L 43/0894* (2013.01); *H04L 12/4625* (2013.01); *H04L 49/205* (2013.01); *H04L 41/0803* (2013.01); *H04L 43/0823* (2013.01); *H04L 49/3009* (2013.01); *H04L 49/354* (2013.01)

(58) Field of Classification Search
CPC .................................................. H04L 12/26
See application file for complete search history.

(56) References Cited

U.S. PATENT DOCUMENTS

| 8,064,465 B2 | 11/2011 | Deguchi et al. | |
|---|---|---|---|
| 2005/0100011 A1* | 5/2005 | Chiruvolu et al. | 370/389 |
| 2008/0049778 A1* | 2/2008 | Yano et al. | 370/422 |
| 2008/0151899 A1* | 6/2008 | Li | 370/392 |
| 2008/0219184 A1* | 9/2008 | Fowler et al. | 370/254 |
| 2008/0279196 A1* | 11/2008 | Friskney et al. | 370/395.53 |

FOREIGN PATENT DOCUMENTS

| JP | A2007-068050 | 3/2007 |
|---|---|---|
| JP | A2007-274529 | 10/2007 |

* cited by examiner

*Primary Examiner* — Brandon Renner
(74) *Attorney, Agent, or Firm* — Fujitsu Patent Center

(57) ABSTRACT

In a communication apparatus, based on the relationship among a first port for outputting frames including tag information, a frame destination address, and bandwidth specified to the first port, a controller generates threshold value information to be associated with a second port to which the frames including tag information are input. With respect to the frames input from the second port, a reception processor measures a reception rate according to the tag information and the frame destination address, and selects, based on the reception rate and the threshold value information, frames to be preferentially discarded at the first port.

4 Claims, 15 Drawing Sheets

FIG. 3

| 8B | 6B | 6B | 4B | 2B | 46B-1500B | 4B |
|---|---|---|---|---|---|---|
| PREAMBLE + SFD | DESTINA-TION MAC ADDRESS | SOURCE MAC ADDRESS | VLAN TAG | TYPE /LENGTH | DATA | FCS |

FIG. 5

MAC ADDRESS TABLE 151

| PORT NUMBER | VLAN-ID | MAC ADDRESS |
|---|---|---|
| 1 | 1 | A, H |
| | 2 | B |
| | 3 | C |
| 2 | 1 | D |
| 3 | 1 | E |
| | 2 | F |
| 4 | 3 | G |

FIG. 6

BANDWIDTH CONTROL TABLE

| PORT NUMBER | VLAN-ID | MAC ADDRESS | BANDWIDTH | THRESHOLD VALUE |
|---|---|---|---|---|
| 1 | 1 | A, H | 1Mbps | D=0.5Mbps;E=0.5Mbps |
| 1 | 2 | B | 1Mbps | F=1Mbps |
| 1 | 3 | C | 1Mbps | G=1Mbps |
| 2 | 1 | D | 1Mbps | A&H=0.5Mbps;E=0.5Mbps |
| 3 | 1 | E | 1Mbps | A&H=0.5Mbps;D=0.5Mbps |
| 3 | 2 | F | 1Mbps | B=1Mbps |
| 4 | 3 | G | 1Mbps | C=1Mbps |

FIG. 8

| RECEPTION RECORD TABLE ||| 153 |
| --- | --- | --- |
| VLAN-ID | MAC ADDRESS | RECEPTION TIME |
| 1 | D | 2010/4/15 12:30:15 |
|   | E | 2010/4/15 12:35:57 |
| 2 | F | 2010/4/15 10:19:40 |
| 3 | G | 2010/4/15 12:21:34 |

COMMUNICATION APPARATUS AND METHOD

CROSS-REFERENCE TO RELATED APPLICATION

This application is based upon and claims the benefit of priority of the prior Japanese Patent Application No. 2011-100942, filed on Apr. 28, 2011, the entire contents of which are incorporated herein by reference.

FIELD

The embodiments discussed herein are related to communication apparatuses and communication methods.

BACKGROUND

Network virtualization technologies for defining multiple logical networks on a single physical network are currently used. One of such network virtualization technologies is a tag-based virtual local area network (VLAN). In tag-based VLAN, a tag which includes a VLAN identifier (VLAN-ID) is inserted into a frame. A communication apparatus (for example, a layer 2 switch) for forwarding frames controls forwarding destinations of the frames by referring to tags so that frames for different VLANs are not mixed together. Tag-based VLAN is used, for example, in a layer 2 network at a data center in order to separate frames with respect to each user.

In regard to bandwidth control among VLANs, a method has been proposed in which a maintenance terminal sets, in a layer 2 switch, bandwidth assigned to individual VLAN groups. In addition, a method has been proposed in which a bandwidth ratio among VLAN groups is set in a layer 2 switch so as to enable automatic bandwidth control according to the band ratio. Further, a proposed communication apparatus capable of forwarding Internet protocol (IP) packets and layer 2 packets by a single switch generates a table for managing virtual channels with the use of information collected using an address resolution protocol (ARP).

Japanese Laid-open Patent Publication No. 2007-274529
Japanese Laid-open Patent Publication No. 2007-68050

In the case when a communication apparatus performs bandwidth control according to tag information, the following method may be considered. On an output port side, the amount of accumulated frames is managed with respect to each piece of the tag information, and frames including particular pieces of the tag information are discarded. However, classifying frames with respect to each output port according to the tag information leaves the problem of low processing efficiency.

For example, in tag-based VLAN, a VLAN-ID is expressed as a 12-bit number, and 4094 VLAN-IDs after excluding two reserved VLAN-IDs are available for users. In the case of performing processing for individual VLANs on the output port side, it is considered to provide, with respect to each port, multiple buffers corresponding to those VLAN-IDs and a scheduler for controlling transmission order of frames stored in the multiple buffers. However, implementation of such a circuit for each output port leads to problems such as an increase in the processing load at the output port side, an increase in the circuit size, and an increase in the power consumption.

SUMMARY

In one aspect of the embodiments, there is provided a communication apparatus that includes a plurality of ports and forwards frames including tag information. The communication apparatus includes a controller configured to, based on a relationship among a first port for outputting the frames including tag information, a frame destination address, and bandwidth specified to the first port, generate threshold value information to be associated with a second port to which the frames including tag information are input; and a reception processor configured to, with respect to the frames input from the second port, measure a reception rate according to the tag information and the frame destination address, and select, based on the reception rate and the threshold value information, frames to be preferentially discarded at the first port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a frame format;

FIG. 5 illustrates an example of a MAC address table;

FIG. 6 illustrates an example of a bandwidth control table;

FIG. 8 illustrates an example of a reception record table;

DESCRIPTION OF EMBODIMENTS

Figure 1:
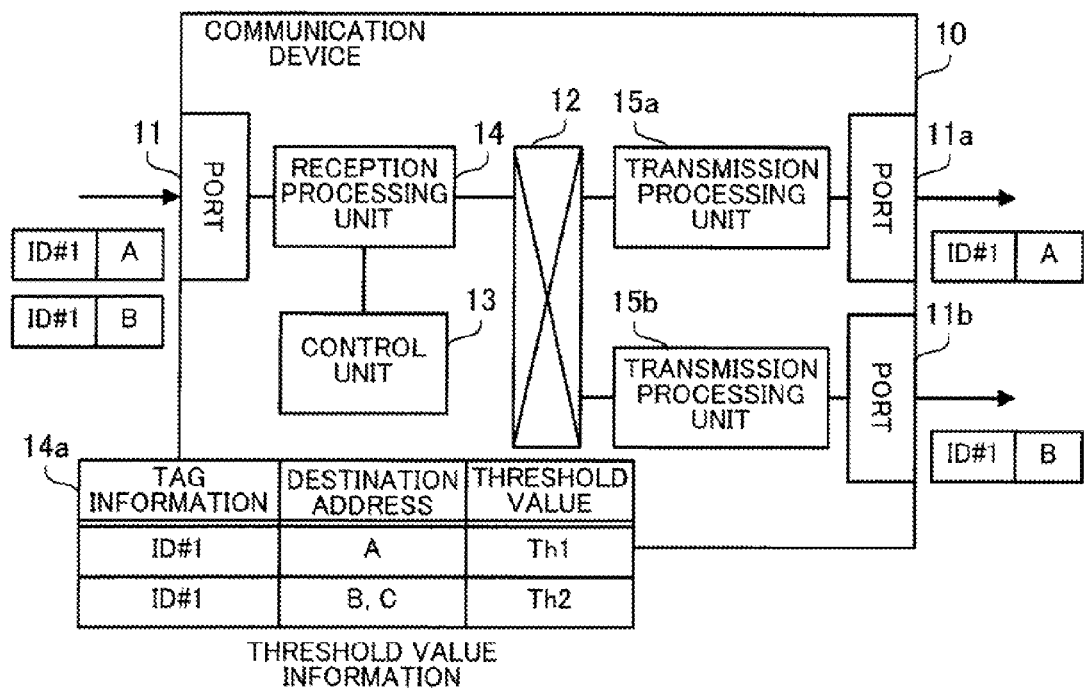
FIG. 1 illustrates a communication device according to a first embodiment.

Several embodiments will be described below with reference to the accompanying drawings, wherein like reference numerals refer to like elements throughout.

[a] First Embodiment

FIG. 1 illustrates a communication device according to a first embodiment. A communication device 10 of the first embodiment forwards frames including tag information. An example of the communication device 10 is a layer 2 switch for forwarding medium access control (MAC) frames including VLAN tags. The communication device includes multiple ports including ports 11, 11a, and 11b; an internal switch 12; a control unit 13; a reception processing unit 14; and transmission processing units 15a and 15b.

To the port 11, frames each of which includes a destination address, a source address, and a tag information piece are input. From the ports 11a and 11b, frames are output. Note however that the port 11 may double as an output port, and the ports 11a and 11b may individually double as input ports. Each tag information piece includes, for example, a VLAN-ID. The addresses are, for example, MAC addresses.

The internal switch 12 determines a port for outputting a frame received by the communication device 10, based on the tag information piece and the destination address included in the frame. The internal switch 12 may hold a forwarding table used for determining an output port. In addition, the internal switch 12 may learn frame forwarding destinations by recording, in the forwarding table, a source address of each frame in association with a port to which the frame is input.

In order to achieve bandwidth control according to the tag information, the control unit 13 generates threshold value information 14a, which is then set to the reception processing unit 14. The threshold value information 14a indicates correspondence among, for example, each tag information piece, an address group which includes one or more destination addresses, and a threshold value. The control unit 13 generates the threshold value information 14a based on the relationship among the ports 11a and 11b for outputting frames including tag information pieces, destination addresses of the frames output from the ports 11a and 11b, and bandwidth specified for the individual ports 11a and 11b.

The control unit 13 calculates one or more threshold values for each of the ports 11a and 11b. This calculation is made, for example, by distributing bandwidth specified according to a tag information piece to another port (including the port 11) to which frames including the tag information piece are input. At this point, for example, groups of destination addresses to be possibly included in frames output from each of the ports 11a and 11b are individually associated with the calculated threshold values. When generating the threshold value information 14a, the control unit 13 may refer to the forwarding table held by the internal switch 12 in order to specify destination addresses for each port.

The reception processing unit 14 sets discard priorities for frames input from the port 11 according to the reception rate, and outputs the frames to the internal switch 12. For example, the reception processing unit 14 attaches a color bit indicating a color, such as "Red" and "Green", to each of the frames. Such a reception processing unit may be provided for each port to which frames are input. For example, the reception processing unit 14 is provided for the port 11.

At this point, for the bandwidth control according to the tag information, the reception processing unit 14 measures reception rates according to the tag information pieces and the destination addresses included in frames, and then sets priorities of the frames based on the measured reception rates and the threshold value information 14a. For example, the reception processing unit 14 measures a reception rate with respect to each combination of tag information piece and address group defined in the threshold value information 14a. Subsequently, when the reception rate exceeds a corresponding threshold value, the reception processing unit 14 determines that frames having the combination of the tag information piece and the address group are to be preferentially discarded. Setting priorities of the frames based on the threshold value information 14a means determining output destinations of the frames including tag information on the input port side. This may also be said to make a prediction of frames to be accumulated on the output port side, with respect to each tag information piece.

Assume here that frames including a tag information piece #1 and a destination address A are likely to be output from the port 11a, and frames including the tag information piece #1 and destination addresses B and C are likely to be output from the port 11b. At this point, bandwidth specified for the port 11a in terms of the tag information piece #1 is distributed to the port 11. With this, the tag information piece #1, an address group {A}, and a threshold value Th1 are associated with one another, and the association is set in the reception processing unit 14. Similarly, bandwidth specified for the port 11b in terms of the tag information piece #1 is distributed to the port 11. With this, the tag information piece #1, the address group {B, C}, and a threshold value Th2 are associated with one another, and the association is set in the reception processing unit 14.

The transmission processing unit 15a acquires frames from the internal switch 12 and then transmits the frames from the port 11a. The transmission processing unit 15b acquires frames from the internal switch 12 and then transmits the frames from the port 11b. When detecting a backlog of frames, the transmission processing unit 15a discards, for bandwidth control, some frames based on the result of the prioritization made on the input port side. For example, the transmission processing unit 15a stores the frames acquired from the internal switch 12 in a queue. If the length of the queue exceeds a threshold value, the transmission processing unit 15a discards frames to which a color bit indicating "Red" is attached until the backlog of frames is cleared. Note that the transmission processing unit 15b performs processing in the same manner as the transmission processing unit 15a described above. Since the frame prioritization is made in view of the tag information, the transmission processing units 15a and 15b do not have to sort out frames according to the tag information in order to determine a frame backlog.

According to the communication device 10 of the first embodiment, the threshold value information 14a to be associated with the port 11, to which frames including tag information are input, is generated by the control unit 13 based on the relationship among the ports 11a and 11b for outputting the frames including tag information, destination addresses of the frames, and bandwidth individually specified for the ports 11a and 11b. Subsequently, in regard to the frames input from the port 11, the reception processing unit 14 measures reception rates according to the tag information and the destination addresses, and selects frames to be preferentially discarded at the ports 11a and 11b, based on the reception rates and the threshold value information 14a.

This allows the input port side to make a prediction of a frame backlog to occur on the output port side, with respect to each tag information piece, in view of output destinations of the frames including tag information. Thus, the input port side is able to determine prioritized frame discard. Therefore, frames are discarded based on the determination of the input port side regarding the prioritized frame discard, which eliminates the necessity of sorting out the frames with respect to each tag information piece at the output port side. For example, in the case where the communication device 10 is a layer 2 switch which supports VLANs, bandwidth control with respect to each VLAN is achieved without providing 4094 queues for each output port. Thus, bandwidth control for each tag information piece is shared by the input port side and the output port side, thus being performed efficiently. Accordingly, it is possible to reduce the processing load on the output port side, the size of the circuit, the power consumption and the like.

[b] Second Embodiment

Figure 2:
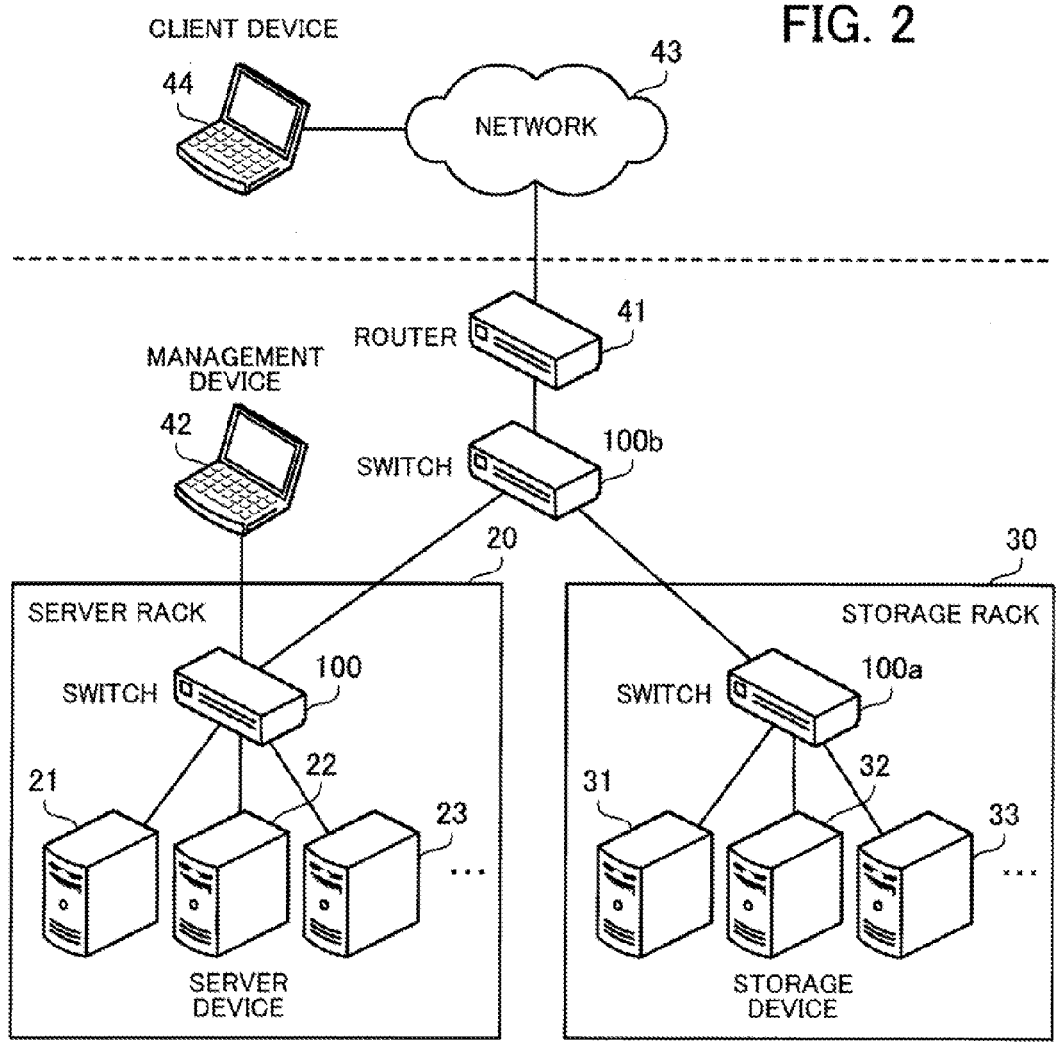
FIG. 2 illustrates a communications system according to a second embodiment.

FIG. 2 illustrates a communications system according to a second embodiment. The communications system of the second embodiment includes multiple server devices including server devices 21, 22, and 23; multiple storage devices including storage devices 31, 32, and 33; a router 41; a management device 42; a client device 44; and switches 100, 100a, and 100b. The communications system may be implemented as, for example, a system of a data center.

The server devices 21, 22, and 23 and the switch 100 are housed in a server rack 20. The storage devices 31, 32, and 33 and the switch 100a are housed in a storage rack 30. The communications system may include multiple server racks, and may include multiple storage racks. The router 41 divides the internal side (a rack side) and the external side (a network 43 side). On the internal side of the router 41, a layer 2 network is formed.

The server devices 21, 22, and 23 are computers available for multiple users. On the server devices 21, 22, and 23, one or more virtual machines (VMs) are run for each user in order to separate information processing of individual users. For example, an operating system (OS) is run for each virtual machine. The virtual machines transmit frames including VLAN tags in order to separate layer 2 communication according to users. For example, one or more VLAN-IDs are assigned to each user.

The storage devices 31, 32, and 33 are computers for managing data and programs used by the virtual machines operating on the server devices 21, 22, and 23. The storage devices 31, 32, and 33 may be provided with nonvolatile storage devices, such as hard disk drives (HDDs) and flash solid state drives (SSD), for storing the data and programs.

The router 41 is a communication device for performing packet processing of an IP layer (layer 3). The router 41 may be a communication device for performing communication processing which exceeds that of layer 3 switches and layer 3. The router 41 forwards packets between the network 43 and the switch 100b.

The management device 42 is a computer used by an administrator as a terminal device. The management device 42 is used, for example, for changing settings of the switches 100, 100a, and 100b.

The client device 44 is a computer used by a user as a terminal device. The client device 44 accesses the layer 2 network, which is located on the internal side in relation to the router 41, via the network 43 to cause a virtual machine allocated to the user to perform information processing.

The switches 100, 100a, and 100b are communication devices for performing frame processing of the MAC layer (layer 2). The switches 100, 100a, and 100b may be layer 2 switches. The switch 100 is a rack-level switch, and forwards frames between the server devices 21, 22, and 23 and the higher-level switch 100b. Similarly, the switch 100a is a rack-level switch, and forwards frames between the storage devices 31, 32, and 33 and the higher-level switch 100b. On the other hand, the switch 100b is an aggregation-level switch, and forwards frames between the router 41 and multiple racks.

The switches 100, 100a, and 100b support VLANs. Here, a large number of VLAN-IDs may be used in the case when virtual machines of a large number of users operate on the server devices 21, 22, and 23. Therefore, the switches 100, 100a, and 100b are configured to handle up to 4094 VLAN-IDs. In addition, since the amount of frame transmission is large between the server devices 21, 22, and 23 and the storage devices 31, 32, and 33, the switches 100, 100a, and 100b are configured to handle frames at high rates. Note that the switches 100, 100a, and 100b are examples of the communication device 10 of the first embodiment.

FIG. 3 illustrates an example of a frame format. The switches 100, 100a, and 100b forwards frames as illustrated in FIG. 3.

The frame example of FIG. 3 includes a 7-byte preamble; a 1-byte Start Frame Delimiter (SFD); a 6-byte destination MAC address; a 6-byte source MAC address; a 4-byte VLAN tag; a 2-byte type or length; a variable-length data with a length ranging from 46 bytes to 1500 bytes; and a 4-byte Frame Check Sequence (FCS).

The preamble consists of 7 bytes of a bit sequence "10101010". The SFD consists of a bit sequence of "10101011". The beginning of the frame is found by detecting the preamble and the SFD.

The destination MAC address is an address indicating a destination of the frame, and a source MAC address is an address indicating a source of the frame. The MAC addresses may be physical addresses assigned to devices, or may be virtual addresses assigned to virtual machines.

The VLAN tag is information used for identifying a VLAN. The VLAN tag includes a 12-bit VLAN-ID. Among 4096 VLAN-IDs expressed by 12 bits, 4094 VLAN-IDs after excluding two reserved VLAN-IDs are available to be assigned to users. By reference to a VLAN-ID of the frame, the transmission range of the frame is limited. For example, at the time of broadcasting a frame, ports for outputting the frame are limited according to the VLAN-ID.

The field of type or length indicates a data length if the value is 1500 or less, and the field indicates a type if the value exceeds 1500. In the case of indicating a data length, the value represents the length of data which follows the field. In the case of indicating a type, the value represents the type of an upper layer protocol. Examples of the value indicating the protocol type are 0×0800 (IP), 0×0806 (ARP), and 0×8100 (802.1Q).

In the field of data, upper-layer protocol packets are stored. In the case where the packet length is less than 64 bytes, padding bits are added to make the length equal to 64 bytes.

The FCS is a value of the Cyclic Redundancy Check (32-bit) (CRC-32) checksum, calculated from the destination MAC address, the source MAC address, the type or length, and the data. A value of the CRC-32 is recalculated by a switch on a receiving side, and bit errors can be detected by cross-checking the FCS with the recalculated value.

Figure 4:
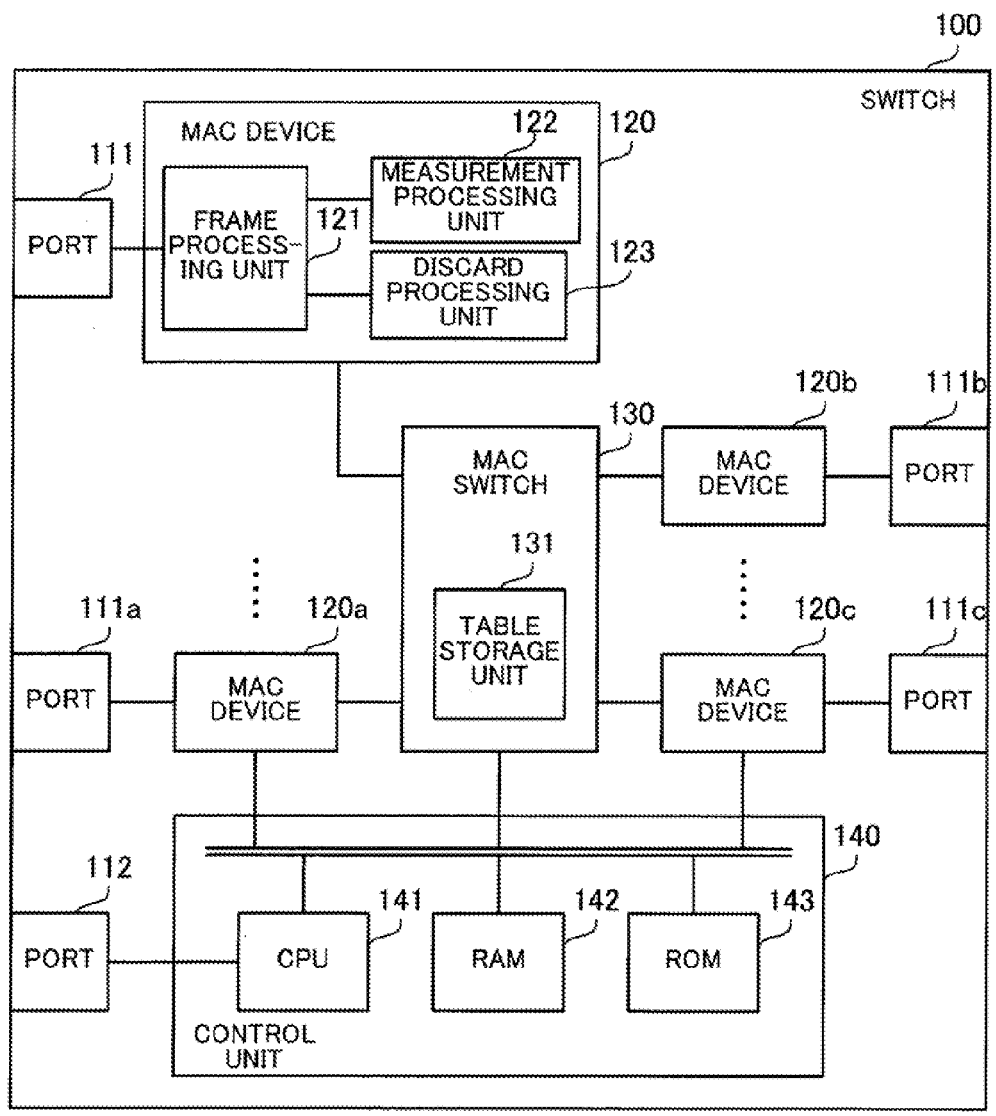
FIG. 4 is a block diagram illustrating a structural example of a switch.

FIG. 4 is a block diagram illustrating a structural example of a switch. The switch 100 includes multiple ports including ports 111, 111a, 111b, and 111c; a port 112; multiple MAC devices including MAC devices 120, 120a, 120b, and 120c; a MAC switch 130; and a control unit 140. The switches 100a and 100b may also be achieved using the same block structure as that of the switch 100.

The ports 111, 111a, 111b, and 111c perform communication processing of the physical layer (layer 1), and transmit and receive frame signals. To the ports 111, 111a, 111b, and 111c, the server devices 21, 22, and 23 and the switch 100b are connected via cables. For example, the port 111 detects preambles and SFCs, then extracts individual frames from a received signal, and outputs the frames to the MAC device 120. In addition, the port 111 converts frames acquired from the MAC device 120 into a transmission signal and then transmits the converted transmission signal.

The port 112 is a port used for managing the switch 100. To the port 112, the management device 42 is connected via a cable and other communication devices. For example, the port 112 outputs a command received from the management device 42 to the control unit 140.

The MAC devices 120, 120a, 120b, and 120c perform frame processing of the MAC layer. The MAC devices 120, 120a, 120b, and 120c are provided in one-to-one correspondence with the ports 111, 111a, 111b, and 111c. The MAC device 120 includes a frame processing unit 121, a measurement processing unit 122, and a discard processing unit 123. The remaining MAC devices may also be achieved using the same block structure as that of the MAC device 120.

The frame processing unit 121 performs error detection on a frame received by the port 111 using the FCS included in the frame. Then, the frame processing unit 121 outputs the frame to the measurement processing unit 122 if no error is detected. In addition, the frame processing unit 121 adds a preamble, a SFD, and a FCS to a frame acquired from the discard processing unit 123, and then outputs the frame to the port 111.

The measurement processing unit 122 measures reception rates for frames acquired from the frame processing unit 121, and marks the frames according to the reception rates. The reception rate measurement is performed with respect to each combination of VLAN-ID and address group consisting of one or more destination MAC addresses. In the marking, a color bit indicating "Red" or "Green" is added to each frame. The marking is determined based on threshold value information notified by the control unit 140. Subsequently, the measurement processing unit 122 outputs the marked frame to the MAC switch 130.

The discard processing unit 123 stores frames acquired from the MAC switch 130 once in a queue, then outputs frames sequentially from the queue to the frame processing unit 121. When the number of frames accumulated in the queue increases (that is, when crowding occurs), the discard processing unit 123 discards some of frames received from the MAC switch 130 by referring to the color bits attached to the frames.

The MAC switch 130 determines output ports for received frames based on VLAN-IDs and the destination MAC addresses included in the frames, and distributes the frames to the MAC devices 120, 120a, 120b, and 120c. The MAC switch 130 includes a table storage unit 131 in which a MAC address table is stored. For each of the received frames, the MAC switch 130 searches for a port corresponding to a VLAN-ID and a destination MAC address of the frame by referring to the MAC address table, to thereby determine an output port for the frame. In the case where the destination MAC address of the frame is not registered in the MAC address table, all ports corresponding to the VLAN-ID of the frame are specified as output ports ("flooding").

In addition, the MAC switch 130 learns MAC addresses. The MAC switch 130 registers, in the MAC address table, a port at which each frame arrives and a source MAC address of the frame in association with each other. With this, it is recognized that a device having the MAC address is connected to the port. On the other hand, the MAC switch 130 deletes a MAC address from the MAC address table when a predetermined period of time has elapsed after the MAC address is registered in the MAC address ("aging"). This is a process provided in view of the possibility of changes in the connections of devices.

The control unit 140 controls the switch 100 in cooperation with the management device 42. For example, the control unit 140 sets, to the measurement processing unit 122, information used for controlling the frame marking process, and sets, to the discard processing unit 123, information used for controlling the frame discard process.

The control unit 140 includes a central processing unit (CPU) 141, a random access memory (RAM) 142, and a read only memory (ROM) 143. The CPU 141 reads a program and data from the ROM 143 and develops the program and data in the RAM 142, to thereby perform processing according to the program. In addition, the CPU 141 receives a command input from the management device 42. The RAM 142 is a volatile memory for temporarily storing a program and data. The ROM 143 is a nonvolatile memory for storing programs and data. The ROM 143 may be a writable memory (for example, a flash memory).

Note that, the ports 111, 111a, 111b, and 111c are examples of the ports 11, 11a, and 11b of the first embodiment. The measurement processing unit 122 is an example of the reception processing unit 14 of the first embodiment. The discard processing unit 123 is an example of the transmission processing units 15a and 15b of the first embodiment. The MAC switch 130 is an example of the internal switch 12 of the first embodiment. The control unit 140 is an example of the control unit 13 of the first embodiment.

FIG. 5 illustrates an example of the MAC address table. A MAC address table 151 is stored in the table storage unit 131 of the MAC switch 130. The MAC address table 151 includes items of "port number", "VLAN-ID", and "MAC address".

In the item of "port number", identification information for identifying each port is registered. In the item of "VLAN-ID", VLAN-IDs of VLANs, each of which is associated with a port indicated by a corresponding port number, are registered. With each port, one or more VLANs included in frames that are allowed to pass the port are associated by the management device 42. In the item of "MAC address", a group consisting of one or more destination MAC addresses included in frames which may be output from a corresponding port is registered with respect to each VLAN.

In the items of "port number" and "VLAN-ID", values are registered according to commands from the management device 42. In the item of "MAC address", a symbol is updated by the MAC switch 130. In the MAC address table 151, information of "port number=1, VLAN-ID=1, and MAC address=A, H" is registered, for example. This indicates that, for example, the port 111 allows frames for VLAN #1 to pass, and a device (or virtual machine) having an address of A and a device (or virtual machine) having an address of H are connected to the port 111.

FIG. 6 illustrates an example of a bandwidth control table. A bandwidth control table 152 is generated by the control unit 140 and then stored, for example, in the RAM 142. The bandwidth control table 152 is used to achieve bandwidth control with respect to each VLAN. The bandwidth control table 152 includes items of "port number", "VLAN-ID", "MAC address", "bandwidth", and "threshold value".

In the item of "port number", identification information for identifying each port is registered. In the item of "VLAN-ID", one or more VLAN-IDs of VLANs are registered with respect to each port. In the item of "MAC address", a group consisting of one or more MAC addresses is registered with respect to each VLAN of the individual ports. In the item of "bandwidth", an upper limit (for example, a value in bits per second (bps)) of the frame transmission rate is registered with respect to each VLAN of the individual ports. The bandwidth is specified by the administrator. In the item of "threshold value", an upper limit of the frame reception rate is registered with respect to each VLAN of the individual ports. Specifically, the frame reception rate is a reception rate of frames for a corresponding VLAN, input from a corresponding port.

According to the second embodiment, in the items of "port number", "VLAN-ID", "MAC address", and "bandwidth", values or symbols are registered according to commands from the management device 42. In the item of "threshold value", values calculated by the control unit 140 are registered. The method of calculating the threshold values is described later in detail. Note that information indicating the correspondence among the VLAN-IDs, the groups of MAC addresses, and the threshold values is notified by the control unit 140 to the MAC devices 120, 120a, 120b, and 120c.

For example, in the bandwidth control table 152, information of "port number=3, VLAN-ID=1, threshold value=A&H=0.5 Mbps; D=0.5 Mbps" is registered, for example. This indicates that the threshold value of a total reception rate of frames having a destination MAC address of A and frames having a destination MAC address of H, among frames for VLAN #1 input to the port 111b, is 0.5 Mbps. The information also indicates that the threshold value of a reception rate of frames having a destination MAC address of D is 0.5 Mbps.

Figure 7:
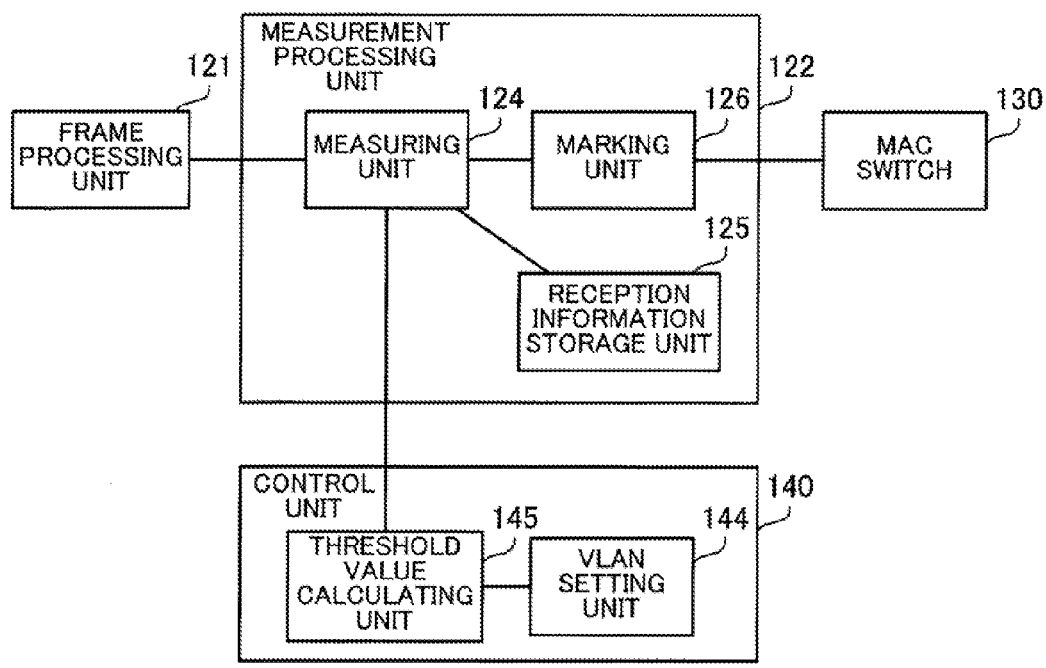
FIG. 7 is a block diagram illustrating a first structural example of a measurement processing unit and a control unit.

FIG. 7 is a block diagram illustrating a first structural example of the measurement processing unit and the control unit. The measurement processing unit 122 includes a measuring unit 124, a reception information storage unit 125, and a marking unit 126. The control unit 140 includes a VLAN setting unit 144 and a threshold value calculating unit 145. The VLAN setting unit 144 and the threshold value calculating unit 145 may be implemented as a program executed by the CPU 141. Alternatively, the VLAN setting unit 144 and the threshold value calculating unit 145 may be implemented as a circuit, such as a field programmable gate array (FPGA).

The VLAN setting unit 144 receives a command from the management device 42 and generates the bandwidth control table 152. According to the second embodiment, information pertaining to the items of "port number", "VLAN-ID", "MAC address" and "bandwidth" of the bandwidth control table 152 is specified by the administrator.

The threshold value calculating unit 145 generates information for the item of "threshold value" based on the information of the items of "port number", "VLAN-ID", "MAC address" and "bandwidth" of the bandwidth control table 152, and then registers the generated information in the bandwidth control table 152. Subsequently, the threshold value calculating unit 145 notifies, to the measurement processing unit 122, information of correspondence among the VLAN-IDs, the groups of MAC addresses, and the threshold values in terms of the port 111.

The measuring unit 124 acquires a frame from the frame processing unit 121 and then outputs the frame to the marking unit 126. In addition, the measuring unit 124 measures a reception rate with respect to each combination of VLAN-ID and group of destination MAC addresses notified by the threshold value calculating unit 145. Subsequently, the measuring unit 124 determines whether the reception rate exceeds a threshold value notified by the threshold value calculating unit 145, and specifies, to the marking unit 126, a color ("Red" or "Green") for the frame according to the result of the determination.

The reception information storage unit 125 stores a reception record table used by the measuring unit 124 to measure reception rates. In the reception record table, a reception time of a frame is recorded for each combination of VLAN-ID and group of destination MAC addresses. The reception record table is updated by the measuring unit 124 each time a frame including a VLAN tag is received.

The marking unit 126 adds, to a frame acquired from the measuring unit 124, a color bit which indicates a color ("Red" or "Green") specified by the measuring unit 124. Subsequently, the marking unit 126 outputs the marked frame to the MAC switch 130.

FIG. 8 illustrates an example of the reception record table. A reception record table 153 is generated by the measuring unit 124 and stored in the reception information storage unit 125. The reception record table 153 includes items of "VLAN-ID", "MAC address", and "reception time".

In the item of "VLAN-ID", one or more VLAN-IDs of VLANs, each of which is associated with the port 111, are registered. In the item of "MAC address", a group consisting of one or more destination MAC addresses is registered with respect to each VLAN. One group of destination MAC addresses corresponds to one output port. In the item of "reception time", the latest reception time is registered with respect to each combination of VLAN and group of destination MAC addresses. The reception time is calculated by the measuring unit 124. Note that the measuring unit 124 may register, in the reception record table 153, threshold values notified by the threshold value calculating unit 145.

Figure 9:
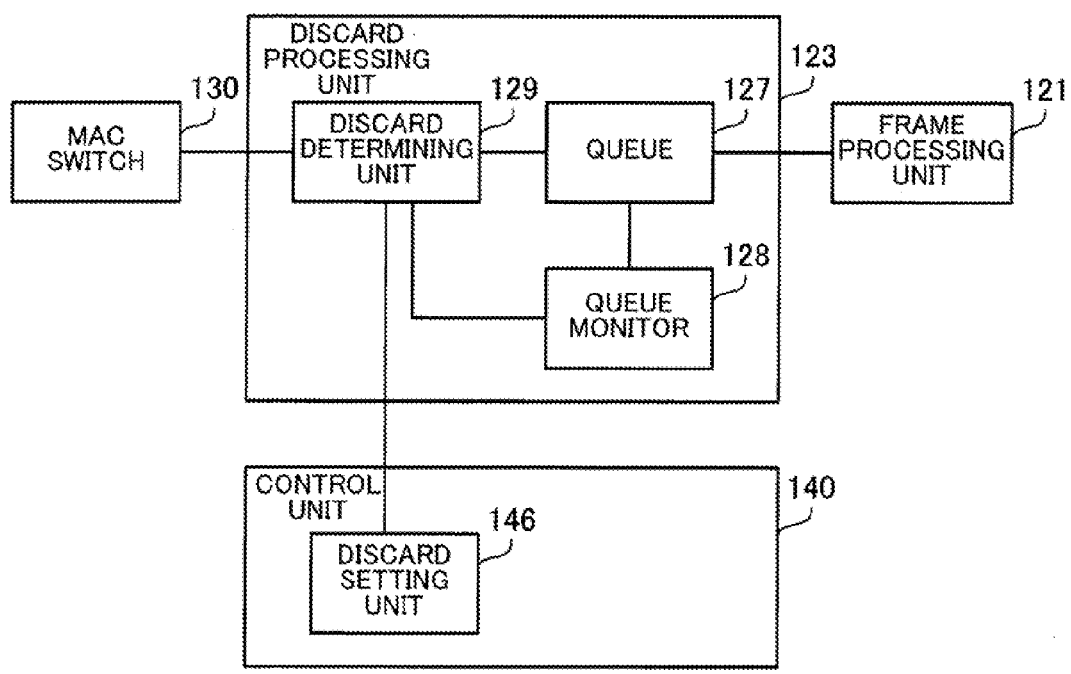
FIG. 9 is a block diagram illustrating a structural example of a discard processing unit and a control unit.

FIG. 9 is a block diagram illustrating a structural example of the discard processing unit and the control unit. The discard processing unit 123 includes a queue 127, a queue monitor 128, and a discard determining unit 129. The control unit 140 includes a discard setting unit 146 in addition to the modules described in FIG. 7. The discard setting unit 146 may be implemented as a program executed by the CPU 141.

The queue 127 temporarily stores frames to be transmitted from the port 111. Using a First-In First-Out (FIFO) method, the queue 127 sequentially outputs, to the frame processing unit 121, frames starting with a frame stored earliest in the queue 127. Note that, for Quality of Service (QoS) control, the discard processing unit 123 may be provided with multiple queues having different priorities.

The queue monitor 128 monitors the amount of frames accumulated in the queue 127 (i.e., queue length), and reports the queue length to the discard determining unit 129.

The discard determining unit 129 acquires a frame from the MAC switch 130, and determines whether to discard the frame, based on the color bit of the frame and the queue length reported by the queue monitor 128. In the case where the queue length exceeds a threshold value, the discard determining unit 129 discards frames to which a color bit indicating "Red" is attached (frames registered on the input port side, to be preferentially discarded). The discard determining unit 129 inserts, into the queue 127, a frame determined not to be discarded.

The discard setting unit 146 sets a threshold value of the queue length to the discard determining unit 129. The threshold value of the queue length is specified, for example, by a command from the management device 42 operated by the administrator.

Figure 10:
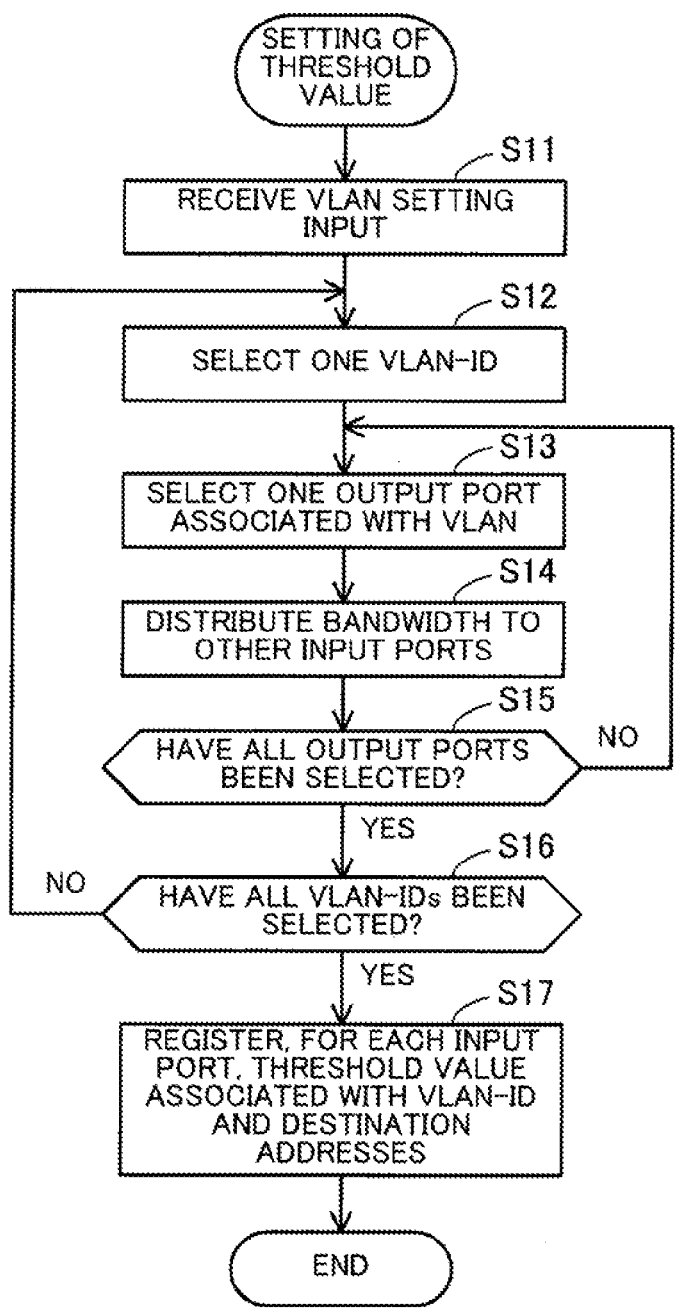
FIG. 10 is a flowchart illustrating a first example of a threshold value setting process.

FIG. 10 is a flowchart illustrating a first example of a threshold value setting process. The process illustrated in FIG. 10 is described next according to the step numbers.

(Step S11) The VLAN setting unit 144 receives a VLAN setting input from the management device 42. In response to the input, the VLAN setting unit 144 generates the bandwidth control table 152. The VLAN setting input includes information pertaining to port numbers, VLAN-IDs, groups of destination MAC addresses, and bandwidth.

(Step S12) The threshold value calculating unit 145 selects one VLAN-ID from VLAN-IDs registered in the bandwidth control table 152.

(Step S13) The threshold value calculating unit 145 selects, as an output port, a port associated with the VLAN-ID selected in Step S12.

(Step S14) The threshold value calculating unit 145 specifies, in the bandwidth control table 152, bandwidth corresponding to the VLAN-ID selected in Step S12 and the port selected in Step S13. Subsequently, the threshold value calculating unit 145 distributes the specified bandwidth to one or more other ports, functioning as input ports, with which the selected VLAN-ID is associated. For example, the specified bandwidth is divided by the number of the other ports to thereby distribute bandwidth equally to the other ports.

(Step S15) The threshold value calculating unit 145 determines whether, in Step S13, all ports which meet the condition (i.e., ports which are associated with the VLAN-ID selected in Step S12) have been selected. In the case where all the ports have been selected, the process proceeds to Step S16. In the case where there is an unselected port, the process proceeds to Step S13.

(Step S16) The threshold value calculating unit 145 determines whether, in Step S12, all VLAN-IDs have been selected. In the case where all the VLAN-IDs have been selected, the process proceeds to Step S17. In the case where there is an unselected VLAN-ID, the process proceeds to Step S12.

(Step S17) The threshold value calculating unit 145 registers, in the bandwidth control table 152, bandwidth distributed to each input port in Step S14 as a threshold value of the input port. The threshold values are registered in such a manner as to be associated with corresponding VLAN-ID and group of destination MAC addresses of the output port side. The threshold value calculating unit 145 notifies information pertaining to the threshold values to the MAC devices 120, 120a, 120b, and 120c.

For example, according to the example of the bandwidth control table 152 of FIG. 6, a bandwidth of 1 Mbps allocated to VLAN #1 of the port 111 (Port #1) is equally distributed to other ports used by VLAN #1, that is, the port 111b (Port #2) and the port 111c (Port #3). With this, for Port #2, the threshold value of frames for VLAN #1 to be output from Port #1 (i.e., frames whose destination MAC address is A or H) is set to 0.5 Mpbs.

In the same fashion, a bandwidth of 1 Mbps allocated to VLAN #1 of Port #2 is equally distributed to other ports, Ports #1 and #3. A bandwidth of 1 Mbps allocated to VLAN #1 of Port #3 is equally distributed to other ports, Ports #1 and #2. With this, for Port #1, the threshold value of frames to be output from Port #2 (frames whose destination MAC address is D) is set to 0.5 Mpbs. In addition, the threshold value of frames to be output from Port #3 (frames whose destination MAC address is E) is set to 0.5 Mpbs.

Note that, in the above description, the bandwidth of the output port is equally distributed to other one or more input ports with which the same VLAN is associated, however, the bandwidth may be distributed in a different manner. For example, the bandwidth distribution may be achieved by giving weights according to the number of virtual machines running on a server device connected to each input port. A large threshold value is set for a port to which a server device accommodating a large number of virtual machines running is connected. With this, the bandwidth is fairly distributed to virtual machines for transmitting frames. The number of virtual machines running on each of the server devices 21, 22, and 23 and VLAN-IDs used by individual virtual machines can be found, for example, by the switches 100, 100a, and 100b making inquiries to the server devices 21, 22, and 23.

Figure 11:
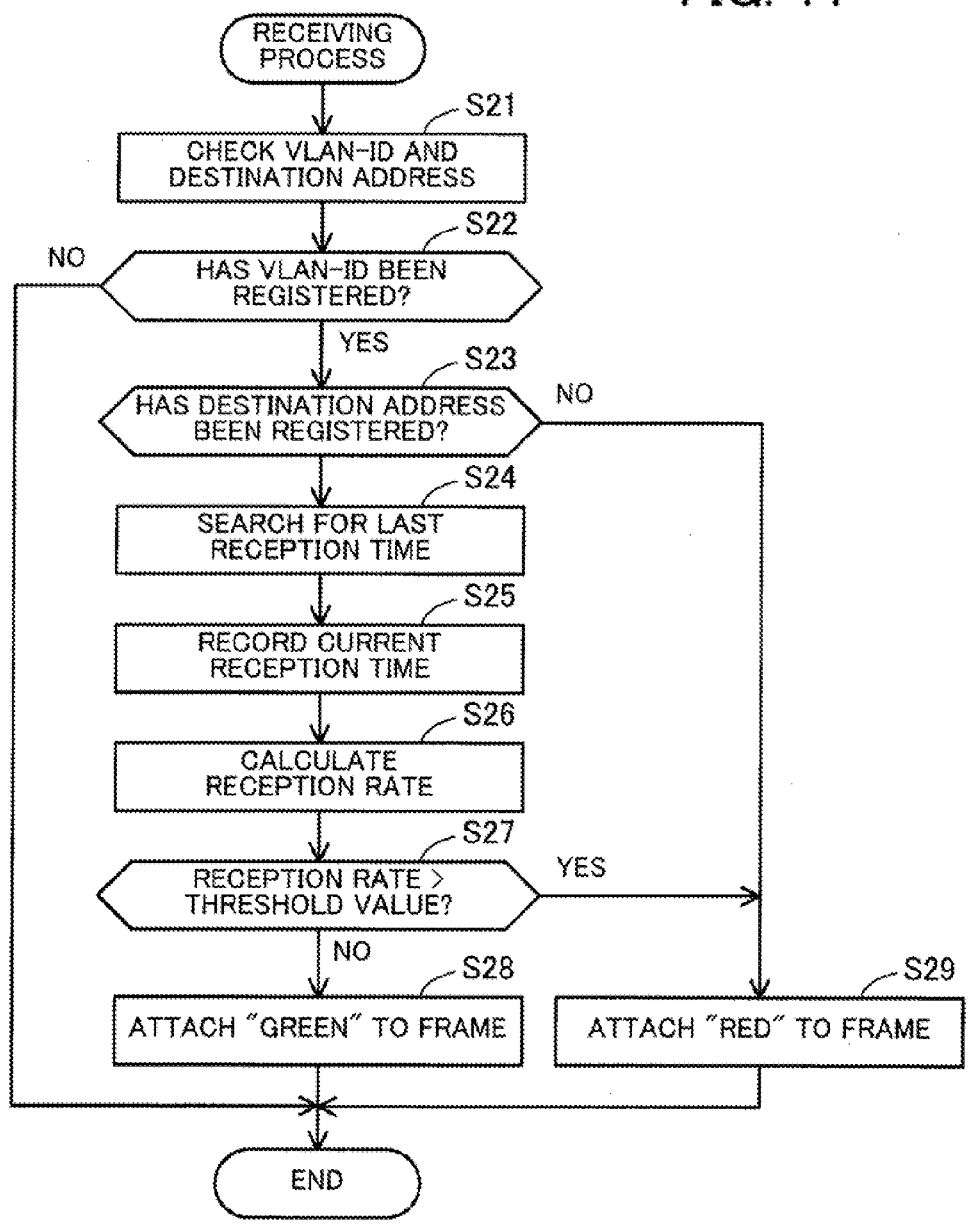
FIG. 11 is a flowchart illustrating an example of a receiving process.

FIG. 11 is a flowchart illustrating an example of a receiving process. The process illustrated in FIG. 11 is described next according to the step numbers.

(Step S21) The measuring unit 124 checks a VLAN-ID and a destination MAC address included in a frame acquired from the frame processing unit 121.

(Step S22) The measuring unit 124 determines whether the VLAN-ID checked in Step S21 has been registered with respect to the port 111. In the case where the registration has been made, the process proceeds to Step S23. In the case where the registration has not been made, the measuring unit 124 determines that the received frame is an improper frame, and therefore discards the frame and ends the process.

(Step S23) The measuring unit 124 determines whether the destination MAC address checked in Step S21 has been registered in the reception record table 153 stored in the reception information storage unit 125. In the case where the destination MAC address has been registered, the process proceeds to Step S24. In the case where the registration has not been made, the process proceeds to Step S29.

(Step S24) The measuring unit 124 searches the reception record table 153 for the last reception time corresponding to the VLAN-ID and destination MAC address checked in Step S21.

(Step S25) The measuring unit 124 records, in the reception record table 153, the current time as the reception time corresponding to the VLAN-ID and the destination MAC address.

(Step S26) The measuring unit 124 calculates a reception rate according to the VLAN-ID and the destination MAC address. The reception rate is calculated, for example, by dividing the data length of the frame by a difference between the current time and the last reception time found in Step S24 (i.e., reception interval).

(Step S27) The measuring unit 124 determines whether the reception rate calculated in Step S26 exceeds the threshold value calculated by the threshold value calculating unit 145 according to the VLAN-ID and the destination MAC address. In the case where the reception rate exceeds the threshold value, the process proceeds to Step S29. In the case where the reception rate is equal to or less than the threshold value, the process proceeds to Step S28.

(Step S28) The measuring unit 124 outputs the frame acquired from the frame processing unit 121 to the marking unit 126 and notifies the marking unit 126 of "Green" as the marking color. The marking unit 126 attaches a color bit indicating "Green" to the frame and outputs the marked frame to the MAC switch 130.

(Step S29) The measuring unit 124 outputs the frame acquired from the frame processing unit 121 to the marking unit 126 and notifies the marking unit 126 of "Red" as the marking color. The marking unit 126 attaches a color bit indicating "Red" to the frame and outputs the marked frame to the MAC switch 130.

Figure 12:
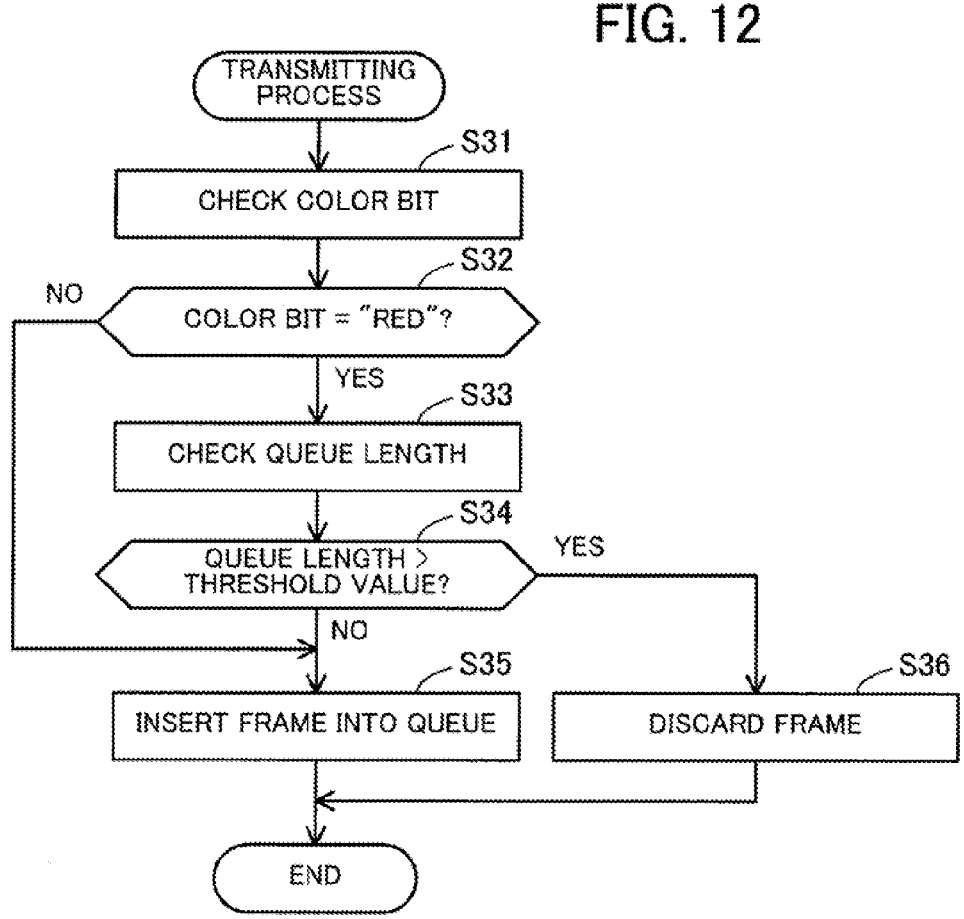
FIG. 12 is a flowchart illustrating an example of a transmitting process.

FIG. 12 is a flowchart illustrating an example of a transmitting process. The process illustrated in FIG. 12 is described next according to the step numbers.

(Step S31) The discard determining unit 129 checks a color bit attached to a frame acquired from the MAC switch 130.

(Step S32) The discard determining unit 129 determines whether the color bit checked in Step S31 indicates "Red". In the case where the color bit is "Red", the process proceeds to Step S33. In the case where the color bit is "Green", the process proceeds to Step S35.

(Step S33) The discard determining unit 129 checks a queue length (the amount of frames accumulated in the queue 127) measured by the queue monitor 128.

(Step S34) The discard determining unit 129 determines whether the queue length checked in Step S33 exceeds a threshold value. In the case where the queue length exceeds the threshold value, the process proceeds to Step S36. In the case where the queue length is equal to or less than the threshold value, the process proceeds to Step S35.

(Step S35) The discard determining unit 129 inserts the frame acquired from the MAC switch 130 into the queue 127. The frame is temporarily stored in the queue 127, then output to the frame processing unit 121 and subsequently transmitted from the port 111.

(Step S36) The discard determining unit 129 discards the frame.

According to the second embodiment, frames are marked on the input port side in view of the bandwidth for each VLAN. Accordingly, the output port side simply selects frames to be discarded based on the color bit, which eliminates the necessity of managing frames with respect to each VLAN. In contrast, in the case where no consideration is made on the input port side for the bandwidth with respect to each VLAN, the output port side has to manage frames with respect to each VLAN. Next described is an example of a switch for managing frames on the output port side with respect to each VLAN.

Figure 13:
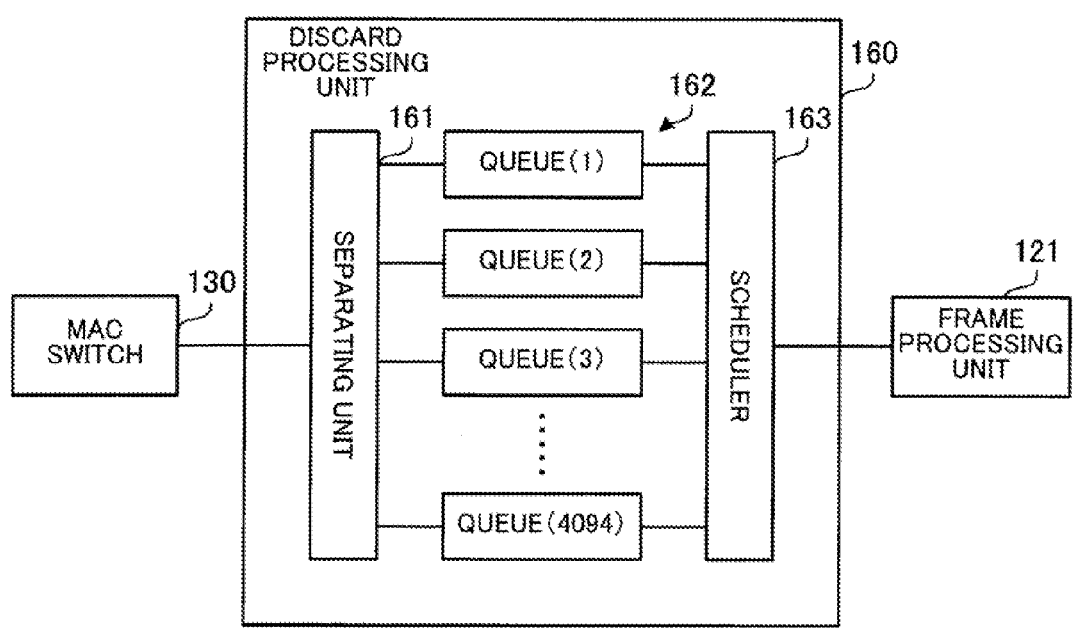
FIG. 13 is a block diagram illustrating another structural example of the discard processing unit.

FIG. 13 is a block diagram illustrating another structural example of the discard processing unit. In the case of managing frames on the output port side with respect to each VLAN, a discard processing unit 160 is provided between the MAC switch 130 and the frame processing unit 121. The discard processing unit 160 includes a separating unit 161, a queue aggregate 162 (Queues #1 to #4094), and a scheduler 163.

The separating unit 161 sorts frames acquired from the MAC switch 130 into Queues #1 to #4094 according to the VLAN-IDs included in the frames. The queue aggregate 162 includes 4094 queues corresponding to 4094 VLAN-IDs allocatable to users. In each queue, frames including the same VLAN-ID are stored. The scheduler 163 schedules frame transmission. The scheduler 163 extracts frames from Queues #1 to #4094 according to a predetermined algorithm and outputs the frames to the frame processing unit 121. As the algorithm, for example, a round robin algorithm is used.

Compared to the discard processing unit 160, the use of the discard processing unit 123 noted in the foregoing enables a reduction in the number of queues and a reduction in the circuit size. In addition, there is no need to provide a large-scale circuit for sorting frames into a large number of queues and a large-scale circuit for scheduling frames stored in the large number of queues. This results in a reduction in the circuit size.

The switches 100, 100a, and 100b according to the second embodiment allow the input port side to give consideration to output ports of frames including VLAN tags and predict a backlog of frames to occur on the output port side with respect to each VLAN, thereby enabling prioritization of the frames. In addition, frame discard is achieved based on the prioritization made on the input port side, which eliminates the necessity of sorting out the frames with respect to each VLAN at the output port side. Thus, bandwidth control with respect to each VLAN is shared by the input port side and the output port side, thus being performed efficiently. Accordingly, it is possible to reduce the processing load, the circuit size, and the power consumption.

Further, by specifying bandwidth for each VLAN on the output port side, the bandwidth is automatically distributed to the input port side, which allows a threshold value for each input port to be automatically calculated. In addition, according to changes in the number of ports with which VLANs are associated, the bandwidth distribution is automatically recalculated. Accordingly, it is possible to reduce operational burden of the administrator and also prevent setting mistakes.

[c] Third Embodiment

Next described is a third embodiment. The following description focuses on differences from the second embodiment, and description common to the second embodiment will not be repeated. A switch according to the third embodiment uses a result of address learning, to thereby reduce operational burden of the administrator in the VLAN setting process.

The switch according to the third embodiment is achieved using the same block structure of the switch 100 of the second embodiment, illustrated in FIG. 4. Note however that the switch of the third embodiment differs from the switch 100 in modules of the program executed using the CPU 141 and the RAM 142.

Figure 14:
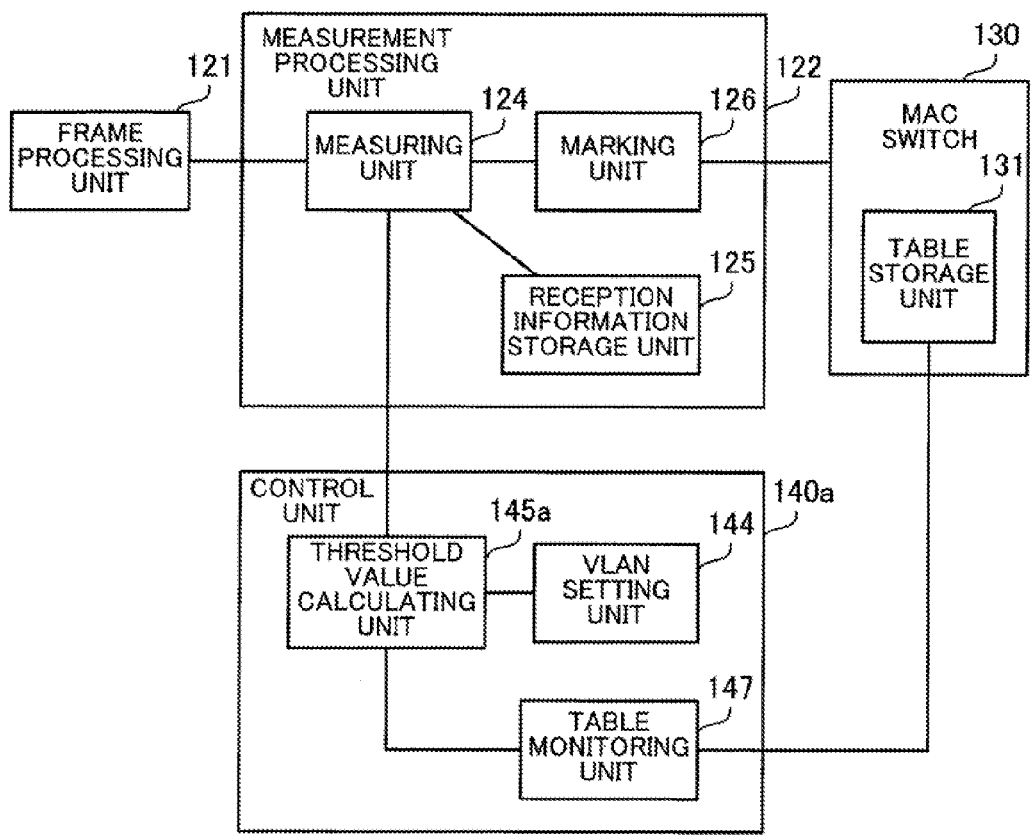
FIG. 14 is a block diagram illustrating a second structural example of the measurement processing unit and the control unit.

FIG. 14 is a block diagram illustrating a second structural example of the measurement processing unit and the control unit. The switch according to the third embodiment uses a control unit 140a in place of the control unit 140 of FIG. 7. The control unit 140a includes a threshold value calculating unit 145a and a table monitoring unit 147 in addition to the VLAN setting unit 144.

The table monitoring unit 147 monitors the MAC address table 151 stored in the table storage unit 131. For example, the table monitoring unit 147 is implemented, for example, as a Content Addressable Memory (CAM) snooper. The table monitoring unit 147 may access the MAC address table 151 on a regular basis (i.e., polling) to determine whether an update has been made to the MAC address table 151. Alternatively, when the MAC address table 151 is updated, the table monitoring unit 147 may acquire an update event from the MAC switch 130. In the case of detecting an update of the MAC address table 151, the table monitoring unit 147 associates an added or deleted MAC address with corresponding port number and VLAN-ID, and then notifies the association to the threshold value calculating unit 145a.

After the VLAN setting unit 144 generates the bandwidth control table 152 in response to receiving a command from the management device 42, the threshold value calculating unit 145a calculates a threshold value with respect to each combination of VLAN-ID and group of destination MAC addresses, as in the case of the threshold value calculating unit 145 of the second embodiment. In addition, on receiving a notification of MAC address addition or deletion from the table monitoring unit 147, the threshold value calculating unit 145a updates a group of destination MAC addresses corresponding to the threshold value. Subsequently, the threshold value calculating unit 145a notifies the update content to the MAC devices 120, 120a, 120b, and 120c.

Figure 15:
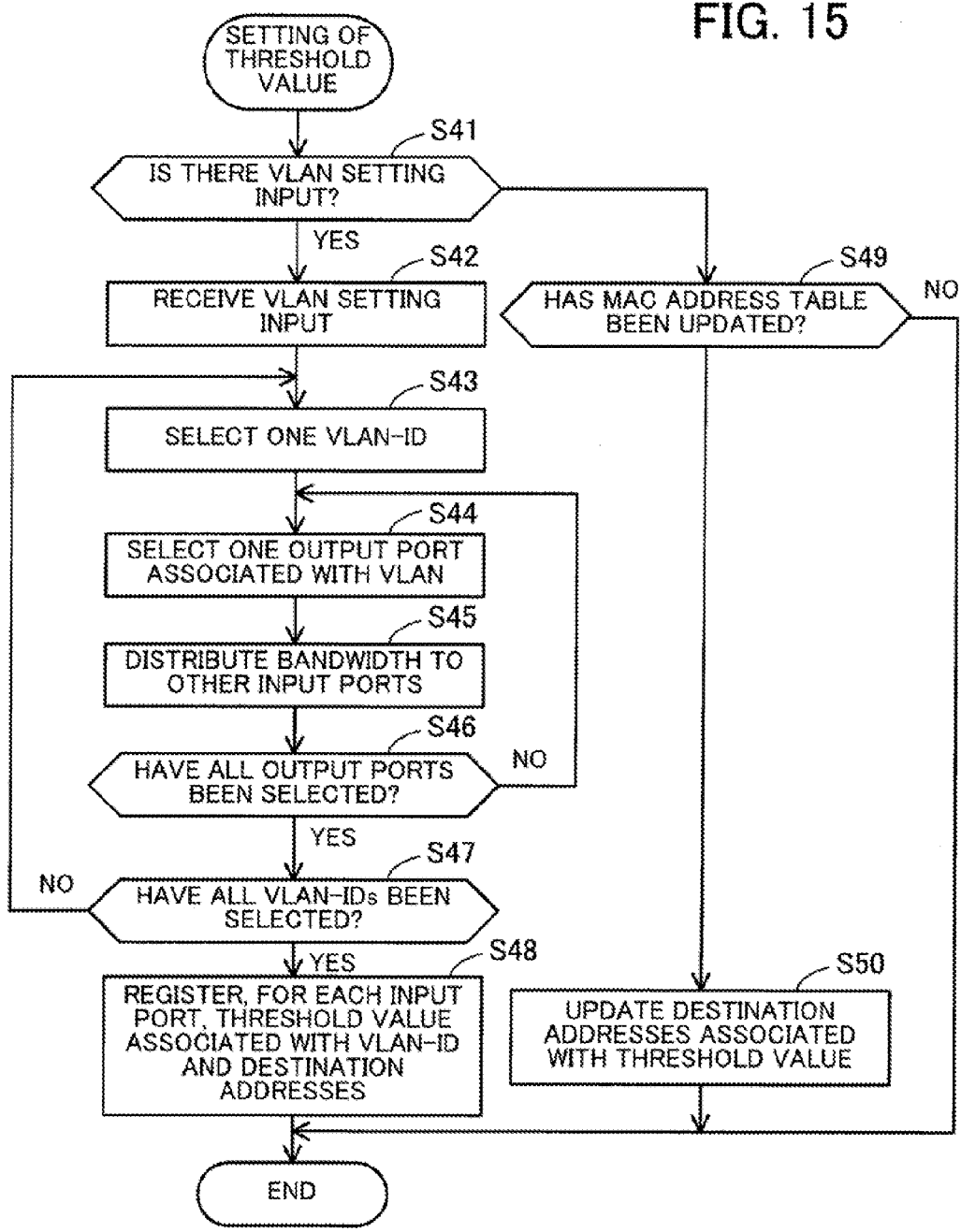
FIG. 15 is a flowchart illustrating a second example of the threshold value setting process.

FIG. 15 is a flowchart illustrating a second example of the threshold value setting process.

(Step S41) The VLAN setting unit 144 determines whether there is a VLAN setting input from the management device 42. In the case where there is a VLAN setting input, the process proceeds to Step S42. In the case where there is no VLAN setting input, the process proceeds to Step S49.

(Steps S42 to S48) The same processes as Steps S11 to S17 of FIG. 10 are performed, and their description are therefore omitted herein.

(Step S49) The table monitoring unit 147 determines whether the MAC address table 151 of the MAC switch 130 has been updated by address learning. In the case where an update has been made to the MAC address table 151, the process proceeds to Step S50. In the case where no update has been made, the process ends.

(Step S50) The threshold value calculating unit 145a makes an appropriate update in the items of "MAC address" and "threshold value" in the bandwidth control table 152, and changes a group of destination MAC address corresponding to the updated threshold value. The threshold value calculating unit 145a notifies the update content to the MAC devices 120, 120a, 120b, and 120c. The measuring unit 124 of the MAC device 120 makes an appropriate update in the item of "MAC address" in the reception record table 153 stored in the reception information storage unit 125.

According to the switch of the third embodiment, the same effect as in the second embodiment can be achieved. In addition, according to the switch of the third embodiment, the bandwidth control table 152 is automatically updated in conjunction with an update of the MAC address table 151 achieved by address learning. As a result, it is possible to further reduce operational burden of the administrator and also prevent setting mistakes.

According to one embodiment, it is possible to efficiently perform bandwidth control of frames including tag information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A communication apparatus that includes a plurality of first ports for outputting frames and one or more second ports to which frames output from a first port among the plurality of first ports are input, and that forwards the frames, the communication apparatus comprising:
   a controller configured to
      calculate a threshold value for the first port among the plurality of first ports by distributing bandwidth, being specified in accordance with tag information to the first port, to the one or more second ports to which frames including the tag information output from the first port are input, based on a relationship among the first port, one or more frame destination addresses, and the bandwidth, the one or more frame destination addresses being included in the frames, and
      generate threshold value information which indicates correspondence among the tag information, the one or more frame destination addresses, and the calculated threshold value; and
   a reception processor configured to,
      with respect to the frames input from each of the one or more second ports, measure a reception rate according to the tag information and the one or more frame destination addresses, and
      select, based on the measured reception rate and the generated threshold value information, frames to be preferentially discarded at the first port.

2. The communication apparatus according to claim 1, wherein
   the controller detects an update of a forwarding table used for determining an output port of each frame based on a frame destination address of the frame, and updates the threshold value information based on the update of the forwarding table.

3. The communication apparatus according to claim 1, wherein
   the controller calculates the threshold value with respect to a group formed according to the tag information and the one or more destination addresses, and
   the reception processor measures the reception rate with respect to the group, and selects, based on the reception rate and the threshold value, the frames to be preferentially discarded.

4. A communication method executed by a communication apparatus including a plurality of first ports for outputting frames and one or more second ports to which frames output from a first port among the plurality of first ports are input, the communication apparatus forwarding the frames, the communication method comprising:
   calculating a threshold value for a first port among the plurality of first ports by distributing bandwidth, being specified in accordance with tag information to the first port, to one or more second ports to which frames including the tag information output from the first port are input, based on a relationship among the first port, one or more frame destination addresses, and the bandwidth, the one or more frame destination addresses being included in the frames;
   generating threshold value information which indicates correspondence among the tag information, the one or more frame destination addresses, and the calculated threshold value;
   measuring, with respect to the frames input from each of the one or more second ports, a reception rate according to the tag information and the one or more frame destination addresses; and
   selecting, based on the measured reception rate and the generated threshold value information, frames to be preferentially discarded at the first port.

* * * * *